(12) United States Patent
Fukushima et al.

(10) Patent No.: US 11,417,983 B2
(45) Date of Patent: Aug. 16, 2022

(54) AIRTIGHT TERMINAL

(71) Applicant: Schott Japan Corporation, Koka (JP)

(72) Inventors: Daisuke Fukushima, Koka (JP); Akira Fujioka, Koka (JP); Hiroki Honda, Koka (JP)

(73) Assignee: Schott Japan Corporation, Koka (JP)

( * ) Notice: Subject to any disclaimer, the term of this patent is extended or adjusted under 35 U.S.C. 154(b) by 0 days.

(21) Appl. No.: 15/733,807

(22) PCT Filed: May 24, 2019

(86) PCT No.: PCT/JP2019/020733
§ 371 (c)(1),
(2) Date: Nov. 30, 2020

(87) PCT Pub. No.: WO2019/230605
PCT Pub. Date: Dec. 5, 2019

(65) Prior Publication Data
US 2021/0234300 A1    Jul. 29, 2021

(30) Foreign Application Priority Data
Jun. 1, 2018 (JP) .............................. JP2018-106001

(51) Int. Cl.
H01R 13/40 (2006.01)
H01R 13/52 (2006.01)
(Continued)

(52) U.S. Cl.
CPC ........... H01R 13/5202 (2013.01); H01R 9/16 (2013.01); H02G 15/013 (2013.01)

(58) Field of Classification Search
CPC ..... H01R 13/5202; H01R 9/16; H02G 15/013
(Continued)

(56) References Cited

U.S. PATENT DOCUMENTS 2,429,955 A * 10/1947 Goldsmith ........... H01B 17/306
174/153 R
4,061,841 A * 12/1977 Sharma ............... H01M 50/186
429/112
(Continued)

FOREIGN PATENT DOCUMENTS

CN        102132042 A      7/2011
CN        202205926 U      4/2012
(Continued)

OTHER PUBLICATIONS

English Translation of Notice of Reasons for Refusal dated Feb. 8, 2021 for JP Application No. 2018-106001.
(Continued)

*Primary Examiner* — Abdullah A Riyami
*Assistant Examiner* — Vladimir Imas
(74) *Attorney, Agent, or Firm* — Dorsey & Whitney LLP

(57) ABSTRACT

Provided is an airtight terminal that is designed for an automotive electric compressor and that eliminates the need for use of a gasket. The airtight terminal includes a metallic outer ring having through holes formed for screw fastening and sealing holes arranged linearly, leads inserted through the sealing holes in the metallic outer ring, and pieces of an insulating material to seal gaps between the metallic outer ring and the respective leads. The metallic outer ring has a seal coat possessing elastic deformability. The seal coat is put on a predetermined surface of the metallic outer ring that is at least a contact surface to which an external device is attached. The seal coat is put in a shape of an oval embankment, and the sealing holes are disposed inside a region surrounded with the embankment-shaped coat. When the airtight terminal is attached to the external device such as an airtight container for an electric compressor, the airtight terminal is fastened with screws, with the embankment-shaped seal coat being pressed against an outer wall surface (Continued)

of the external device and being elastically deformed. At the same time, a terminal attachment hole formed in the outer wall surface of the external device is disposed inside the oval embankment of the seal coat. This can hermetically isolate an inside and an outside of the oval embankment from each other.

20 Claims, 6 Drawing Sheets

(51) Int. Cl.
   *H01R 9/16* (2006.01)
   *H02G 15/013* (2006.01)
(58) Field of Classification Search
   USPC .......................................................... 439/587
   See application file for complete search history.

(56) References Cited

U.S. PATENT DOCUMENTS

| | | | | |
|---|---|---|---|---|
| 4,362,792 | A * | 12/1982 | Bowsky | H01M 50/191 429/181 |
| 4,841,101 | A * | 6/1989 | Pollock | H01B 17/305 174/152 GM |
| 4,984,973 | A * | 1/1991 | Itameri-Kinter | H01B 17/305 174/152 GM |
| 5,017,740 | A * | 5/1991 | Honkomp | H01B 17/305 174/138 F |
| 5,227,587 | A * | 7/1993 | Paterek | H01B 17/305 174/151 |
| 5,493,073 | A * | 2/1996 | Honkomp | H01B 17/305 174/152 GM |
| 5,866,851 | A * | 2/1999 | Taylor | A61N 1/3754 174/152 GM |
| 6,111,198 | A * | 8/2000 | Tower | H01L 21/50 174/135 |
| 6,114,633 | A * | 9/2000 | Duhancik | H01R 13/521 174/135 |
| 6,322,086 | B1 | 11/2001 | Yokomachi et al. | |
| 6,500,027 | B1 * | 12/2002 | Van Der Sanden | H01R 13/5216 439/587 |
| 6,616,480 | B2 * | 9/2003 | Kameyama | H01R 13/521 439/271 |
| 6,841,731 | B1 * | 1/2005 | Zanello | H01J 5/36 174/50.56 |
| 7,745,725 | B2 * | 6/2010 | Paterek | H01R 9/16 174/50.52 |
| 8,454,329 | B2 * | 6/2013 | Taguchi | H02G 3/22 417/422 |
| 8,487,187 | B2 * | 7/2013 | VandenEynden | H01B 17/30 174/152 GM |
| 8,921,700 | B2 * | 12/2014 | VandenEynden | H01B 17/305 174/152 GM |
| 9,979,118 | B2 * | 5/2018 | Khadkikar | F04B 39/121 |
| 10,468,801 | B2 * | 11/2019 | Okuno | H01R 13/03 |
| 10,505,319 | B2 * | 12/2019 | Hayasaka | H01R 13/6581 |
| 10,580,602 | B2 * | 3/2020 | Morikawa | H01H 50/14 |
| 10,714,867 | B2 * | 7/2020 | Koyama | H01R 13/5202 |
| 10,834,835 | B2 * | 11/2020 | Okuno | H01R 9/16 |
| 11,071,220 | B2 * | 7/2021 | Hartl | H05K 5/069 |
| 2008/0279703 | A1 * | 11/2008 | Wang | F01C 1/10 417/422 |
| 2012/0018216 | A1 | 1/2012 | Harada et al. | |
| 2013/0330600 | A1 * | 12/2013 | Goedeke | C03C 8/24 429/163 |
| 2013/0330603 | A1 * | 12/2013 | Kroll | H01M 10/0569 429/179 |
| 2013/0337316 | A1 * | 12/2013 | Kroll | H01M 50/183 429/181 |
| 2016/0020547 | A1 * | 1/2016 | Khadkikar | F04B 53/16 439/587 |

FOREIGN PATENT DOCUMENTS

| | | |
|---|---|---|
| CN | 203434297 U | 2/2014 |
| CN | 203434794 U | 2/2014 |
| CN | 104167632 A | 11/2014 |
| CN | 204376080 U | 6/2015 |
| CN | 205657243 U | 10/2016 |
| CN | 207149782 U | 3/2018 |
| EP | 0397230 A2 | 11/1990 |
| EP | 2325488 A1 | 5/2011 |
| EP | 2885795 B1 | 11/2017 |
| JP | S33-003929 Y2 | 3/1958 |
| JP | S6031079 U | 3/1985 |
| JP | S60166978 U | 11/1985 |
| JP | S62124777 A | 6/1987 |
| JP | S62124777 U | 8/1987 |
| JP | S62129779 U | 8/1987 |
| JP | S62140676 U | 9/1987 |
| JP | H02304269 A | 12/1990 |
| JP | H0578965 A | 3/1993 |
| JP | H1145748 A | 2/1999 |
| JP | 2000170656 A | 6/2000 |
| JP | 2007250340 A | 9/2007 |
| JP | 2010192396 A | 9/2010 |
| JP | 2015536020 A | 12/2015 |
| WO | 2010117000 A1 | 10/2010 |

OTHER PUBLICATIONS

English translation of International Preliminary Report on Patentability for Application No. PCT/JP2019/020733, dated Dec. 1, 2020.
English translation of International Search Report and Written Opinion for Application No. PCT/JP2019/020733, dated Aug. 13, 2019.
English translation of Written Opinion for Application No. PCT/JP2019/020733, dated Aug. 13, 2019.
[English Translation] First Office Action dated Jul. 30, 2021 for Chinese Application No. 201980036531.7.
[English Translation] Notice of Reasons for Refusal dated Sep. 29, 2021 for Japanese Patent Application No. 2018-106001; pp. all.
[English Translation] Second Office Action dated Mar. 14, 2022 for the Chinese Patent Application No. 201980036531.7; pp. all.
[English Translation] Notice of Reasons for Refusal dated Apr. 15, 2022 for Japanese Patent Application No. 2018-106001; pp. all.

* cited by examiner

AIRTIGHT TERMINAL

CROSS REFERENCE TO RELATED APPLICATION(S)

This application is a U.S. National Stage filing under 35 U.S.C. § 371 of PCT Application No. PCT/JP2019/020733, filed May 24, 2019, which claims priority to Japanese Application No. 2018-106001 filed Jun. 1, 2018, which applications are incorporated herein by reference in their entirety, for any purpose.

TECHNICAL FIELD

The present invention relates to an airtight terminal, and particularly relates to an airtight terminal used for an electric compressor for automotive application.

BACKGROUND ART

An airtight terminal is configured by hermetically sealing an eyelet or a metallic outer ring and a lead in a through hole in the eyelet or the metallic outer ring with a glass insulating material, and airtight terminals are used to supply current to electrical devices or elements housed in airtight containers and guide signals outside from the electrical devices or the elements. For instance, as shown in International Publication No. WO 2010/117000 (Patent Literature 1), an airtight terminal used for a compressor in an apparatus such as a refrigerator or an air conditioner has a metallic outer ring that includes a top plate, a cylindrical portion extending downward from an outer peripheral end of the top plate, a flange widening obliquely outward from a lower end of the cylindrical portion, and three small tubular portions forming respective lead sealing holes extending internally from the top plate. Sealed leads are hermetically sealed in the lead sealing holes in the metallic outer ring with respective pieces of a glass insulating material for sealing.

Now, some hybrid vehicles are configured to stop their engine when the vehicles temporarily stop at a traffic signal or other reason for an intended purpose of reducing the impact of their engine on the environment. In such a case, if a compressor driven by an engine is used, the air conditioner stops every time the vehicles stop. This poses a problem especially at extremely cold or extremely hot places, in summer or winter. Hence, an electric compressor with an electric motor incorporated in an iron-made container is used. The electric compressor has a compression mechanism similar to that of electric compressors for indoor air conditioning. However, as for the disposition of machinery in the engine room of hybrid vehicles and electric vehicles, in response to demand for vehicle weight reduction and other improvements, when devices are disposed in the engine room, it is being tried to save space to the utmost degree. This has created a situation in which it is difficult to secure an enough space for installation of the electric compressor in the engine room. Thus, the airtight terminal for the electric compressor for automotive application has a configuration in which three terminals are arranged linearly and a size around a socket and other parts is small rather than a configuration of the airtight terminal for indoor air conditioning in which three terminals are arranged at 120° intervals on a circumference of an identical circle.

DOCUMENT LIST

Patent Literature

Patent Literature 1: International Publication No. WO 2010/117000

SUMMARY OF INVENTION

Technical Problem in hybrid vehicles and electric vehicles, in a similar way to indoor air conditioners, compressors driven by electric motors, i.e., a compressor with a built-in electric motor that has both a compression mechanism and an electric motor incorporated in an airtight container are used, rather than compressors driven by engines. These electric compressors for automotive application are preferably more space-saving, smaller, and lighter as much as possible in consideration of installation in narrow engine rooms. Since the electric motor drives the compressor through the airtight terminal attached to an attachment hole in the airtight container, pins of most airtight terminals used for such compressors are arranged in one series line as shown in FIGS. 1A, 1B and 1C, to be advantageous in space saving. The airtight terminal for automotive electric compressors is fastened with screws to the attachment hole in the airtight container housing the electric motor. Conventionally, when the airtight terminal is attached to the airtight container, a separate metal gasket needs to be put and fitted between the airtight terminal and the airtight container.

In terms of airtight terminal for an automotive electric compressor, it is an object of the present invention to provide an airtight terminal that eliminates the need for use of a gasket.

Solution to Problem

According to the present invention, an airtight terminal includes a metallic outer ring having a sealing hole, a lead inserted through the sealing hole in the metallic outer ring, and an insulating material to hermetically seal a gap between the metallic outer ring and the lead, is provided, wherein the metallic outer ring has a seal coat put on a surface of the metallic outer ring coming into contact with an external device. The surface coming into contact with the external device, described herein, refers to a contact surface of the metallic outer ring that comes into contact with an external device such as an airtight container to hermetically fix the airtight terminal to the external device. The seal coat is fixed or attached to the metallic outer ring. Since the seal coat is put on the contact surface coming into contact with the external device, fastening the airtight terminal to the airtight container ensures airtightness for the contact surface. This allows only the airtight terminal to be directly attached to a pressure vessel housing an electric compressor. According to the present invention, unlike the conventional airtight terminal, it becomes unnecessary to install a metal gasket. Hence, the present invention contributes to simplify an assembly process for electric compressors and reduce a number of components, thus an economic effect can be obtained.

DESCRIPTION OF EMBODIMENTS

An airtight terminal according to the present invention, as illustrated in FIGS. 1A to 6C, includes a metallic outer ring having at least one sealing hole, a lead inserted through the sealing hole in the metallic outer ring; and an insulating material to seal a gap between the metallic outer ring and the lead, wherein the metallic outer ring has a seal coat put on a contact surface to which an external device is attached. When the airtight terminal is attached to the external device by screw fastening or another method, the seal coat closes and hermetically seals a gap between an attachment part of the external device and the airtight terminal. This allows the airtight terminal to be readily attached without loss of airtightness.

The seal coat of the airtight terminal according to the present invention is made of a structure possessing elastic deformability. The seal coat may be made of any material or structure without particular limitation, with the proviso that the seal coat is elastically deformable and is able to seal the gap without leakage of gas and liquid when the seal coat is pressed against and fixed to a predetermined wall surface of the attachment part of the external device to which the airtight terminal is attached by screw fastening or another method. Preferably, the seal coat is made of a material selected from rubber, an elastomer, a plastic, and a metal, or either of a composite material and a composite structure that is made up of any of rubber, an elastomer, a plastic, and a metal, for example.

Figure 1A:
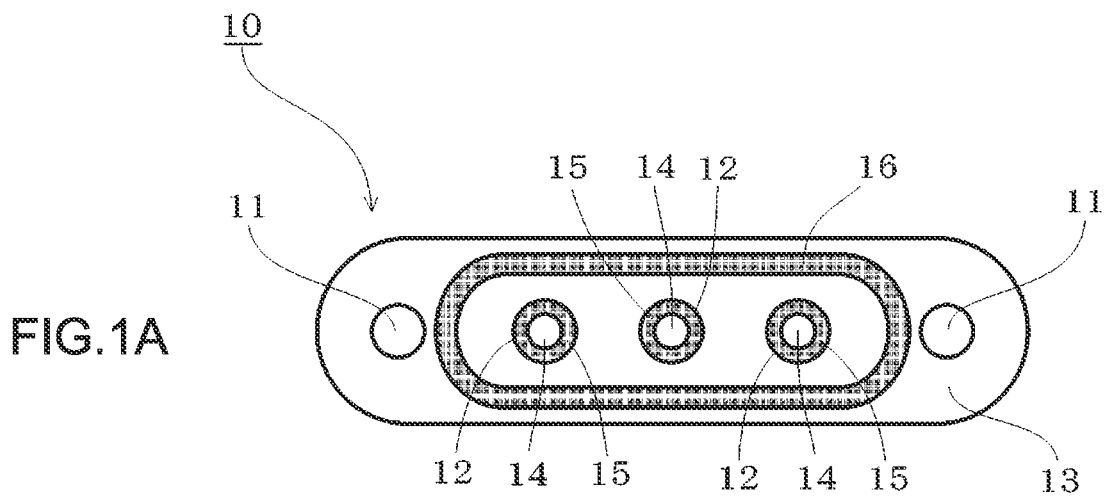
FIG. 1A A plan view illustrating an airtight terminal 10 according to the present invention FIG. 1B A cross-sectional elevation view illustrating an airtight terminal 10 according to the present invention FIG. 1C A bottom view illustrating an airtight terminal 10 according to the present invention FIG. 2A A plan view illustrating an airtight terminal 20 according to the present invention FIG. 2B A cross-sectional elevation view illustrating an airtight terminal 20 according to the present invention FIG. 2C A bottom view illustrating an airtight terminal 20 according to the present invention FIG. 3A A plan view illustrating an airtight terminal 30 according to the present invention FIG. 3B A cross-sectional elevation view illustrating an airtight terminal 30 according to the present invention FIG. 3C A bottom view illustrating an airtight terminal 30 according to the present invention FIG. 4A A plan view illustrating an airtight terminal 40 according to the present invention FIG. 4B A cross-sectional elevation view illustrating an airtight terminal 40 according to the present invention FIG. 4C A bottom view illustrating an airtight terminal 40 according to the present invention FIG. 5A A plan view illustrating an airtight terminal 50, which is a modification example of the airtight terminal 40, according to the present invention FIG. 5B A cross-sectional elevation view illustrating an airtight terminal 50, which is a modification example of the airtight terminal 40, according to the present invention FIG. 5C A bottom view illustrating an airtight terminal 50, which is a modification example of the airtight terminal 40, according to the present invention FIG. 6A A plan view illustrating an airtight terminal 60, which is a modification example of the airtight terminal 40, according to the present invention FIG. 6B A cross-sectional elevation view illustrating an airtight terminal 60, which is a modification example of the airtight terminal 40, according to the present invention FIG. 6C A bottom view illustrating an airtight terminal 60, which is a modification example of the airtight terminal 40, according to the present invention
Figure 1B:
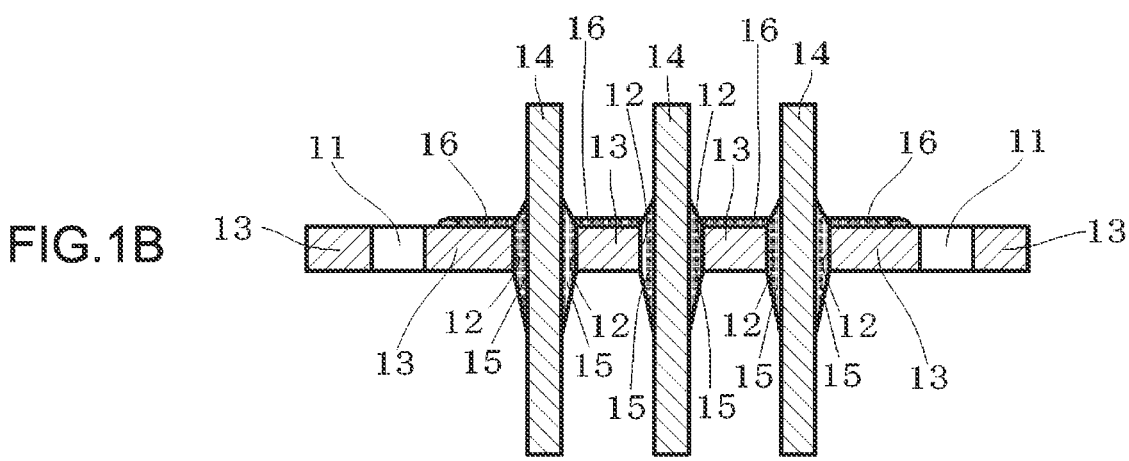
Figure 1C:
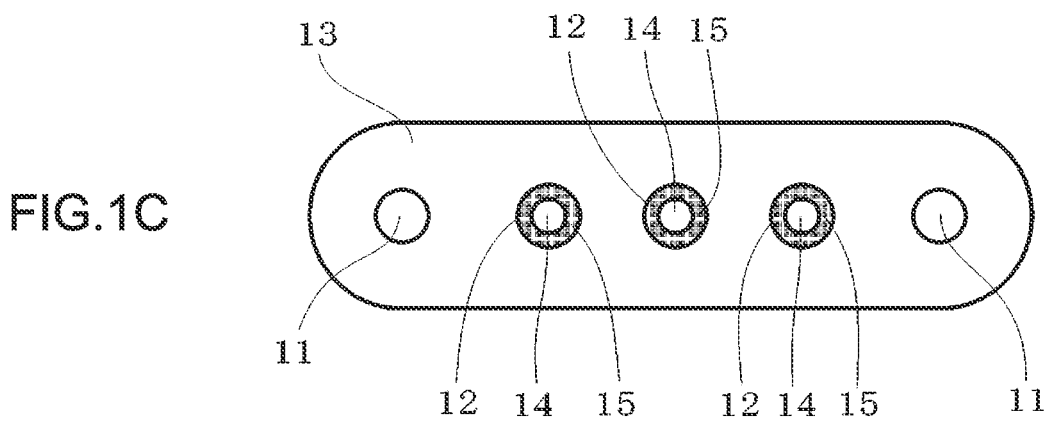

As illustrated in FIGS. 1A, 1B and 1C, an airtight terminal 10 of the present invention includes a metallic outer ring 13 having through holes 11 formed for screw fastening and sealing holes 12 arranged linearly, leads 14 inserted through the sealing holes 12 in the metallic outer ring 13, and pieces of an insulating material 15 to seal gaps between the metallic outer ring 13 and the respective leads 14, wherein the metallic outer ring 13 has a seal coat 16 possessing elastic deformability, the seal coat 16 being put on a predetermined surface of the metallic outer ring 13 that is at least a contact surface to which an external device is attached, the seal coat 16 is put in a shape of an oval embankment, and the sealing holes 12 are disposed inside a region surrounded with the embankment-shaped coat. When the airtight terminal 10 is attached to the external device such as an airtight container for an electric compressor, the airtight terminal 10 is fastened with screws, with the embankment-shaped seal coat 16 being pressed against an outer wall surface of the external device and being elastically deformed. At the same time, a terminal attachment hole formed in the outer wall surface of the external device is disposed inside the oval embankment of the seal coat 16. This can hermetically isolate an inside and an outside of the oval embankment from each other. In other words, attachment of the airtight terminal can be completed readily and promptly only by putting the airtight terminal 10 on the attachment hole in the external device and fastening the airtight terminal 10 to the external device with screws after the leads are electrically connected to the external device.

Figure 2A:
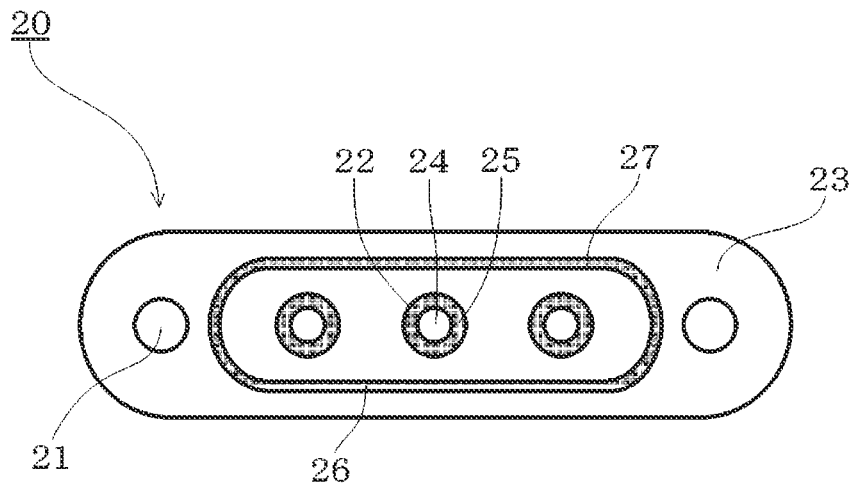
Figure 2B:
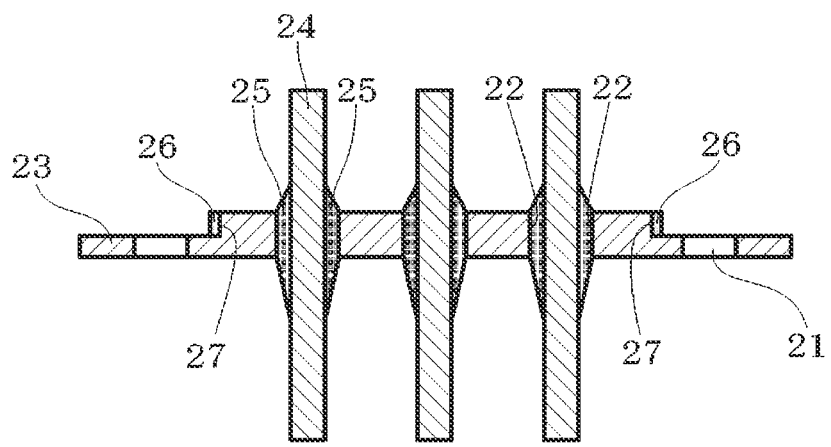
Figure 2C:
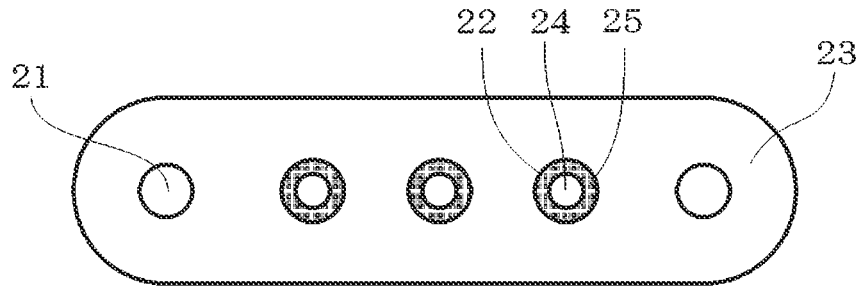

As illustrated in FIGS. 2A, 2B and 2C, an airtight terminal 20 of the present invention includes a metallic outer ring 23 having through holes 21 formed for screw fastening, sealing holes 22 arranged linearly, and a step 27 forming a contact surface for attachment of an external device, leads 24 inserted through the sealing holes 22 in the metallic outer ring 23, and pieces of an insulating material 25 to seal gaps between the metallic outer ring 23 and the respective leads 24, wherein the metallic outer ring 23 has a seal coat 26 possessing elastic deformability, the seal coat 26 being put on an outer peripheral wall of the step 27, and the sealing holes 22 are disposed inside a region surrounded with the seal coat 26. The airtight terminal 20 is fastened to the external device with screws, with the seal coat 26 put on the step 27 being pressed against an inner wall surface of a terminal attachment hole in the external device and being elastically deformed. This hermetically seals a gap between the terminal attachment hole in the external device and the metallic outer ring 23 of the airtight terminal 20 and thus ensures airtightness around an area where the terminal attachment hole in the external device is put on the metallic outer ring 23. In other words, attachment of the airtight terminal 20 can be completed readily and promptly only by putting the airtight terminal 20 on the terminal attachment hole in the external device and fastening the airtight terminal 20 to the external device with screws after the leads 24 are electrically connected to the external device.

Figure 3A:
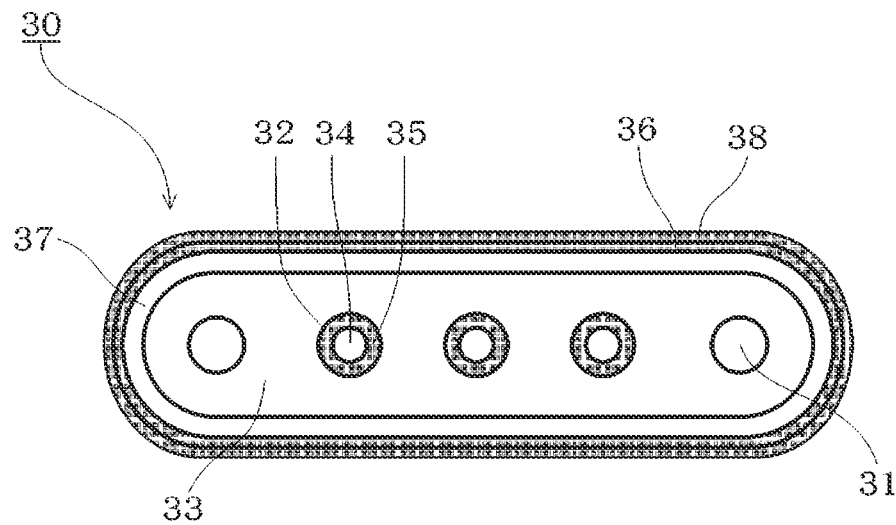
Figure 3B:
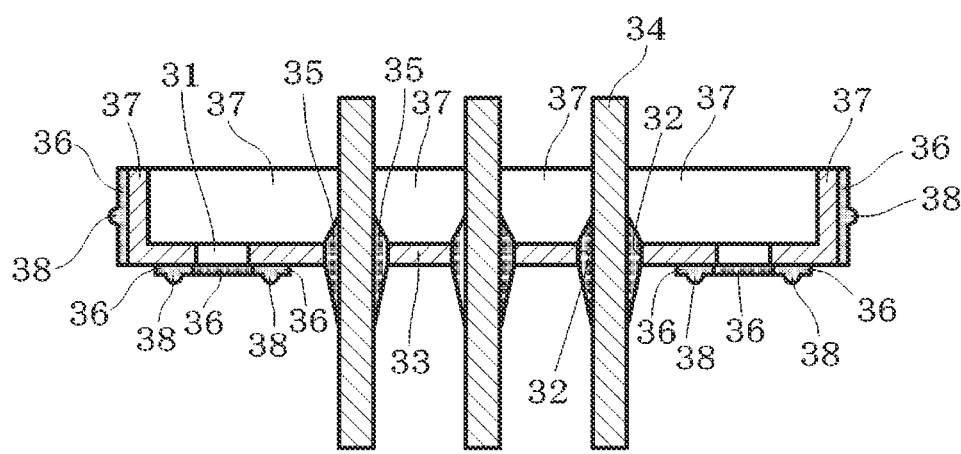
Figure 3C:
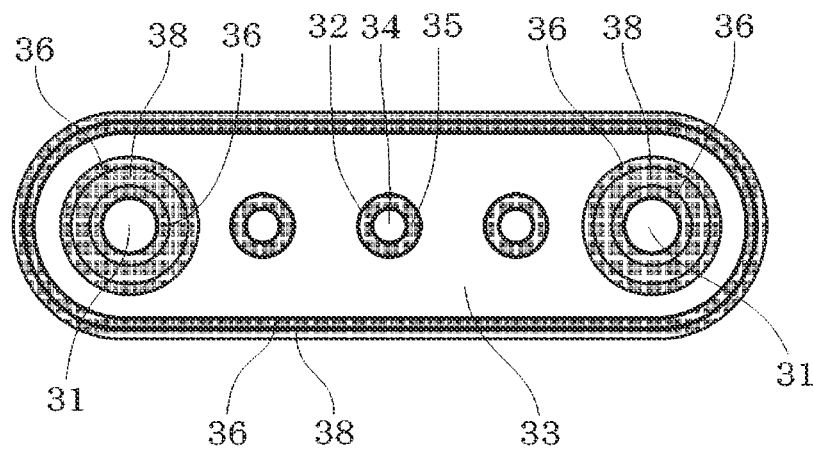

As illustrated in FIGS. 3A, 3B and 3C, an airtight terminal 30 of the present invention includes a metallic outer ring 33 having through holes 31 formed for screw fastening, sealing holes 32 arranged linearly, and a peripheral wall part 37 that is an outer end extending vertically to form a surface coming into contact with an external device, leads 34 inserted through the sealing holes 32 in the metallic outer ring 33, and pieces of an insulating material 35 to seal gaps between the metallic outer ring 33 and the respective leads 34, wherein the metallic outer ring 33 has a seal coat 36 possessing elastic deformability, the seal coat 36 being put on the surface coming into contact with the external device, which is made up of the peripheral wall part 37 and at least a periphery of an opening of each of the through holes 31, and the sealing holes 32 are disposed inside a region surrounded with the seal coat 36 put on the peripheral wall part 37 and the peripheries of the openings of the through holes 31. The seal coat 36 is put in a shape of a flat sheet throughout a predetermined surface of the metallic outer ring 33 so as to close an opening in the surface of the airtight terminal 30 coming into contact with the external device when the airtight terminal 30 is put on the external device. The leads 34 are disposed inside the region surrounded with the seal coat 36 and isolated from outside. The flat sheet coat of the seal coat 36 may partly protrude in a shape of an embankment to form protrusions 38 as needed. The airtight terminal 30 is fastened to the external device with screws, with the seal coat 36 put on the peripheral wall part 37 and the peripheries of the openings of the through holes 31 being pressed against a wall surface of the external device to which the airtight terminal 30 is attached and being elastically deformed. This hermetically seals a gap between the metallic outer ring 33 of the airtight terminal 30 and the wall surface of the external device being in contact with the airtight terminal 30 and thus ensures airtightness around an area where a terminal attachment hole in the external device is put on the metallic outer ring 33. Attachment of the airtight terminal 30 can be completed readily and promptly only by putting the airtight terminal 30 on the terminal attachment hole in the external device and fastening the airtight terminal 30 to the external device with screws after the leads 34 are electrically connected to the external device.

Figure 4A:
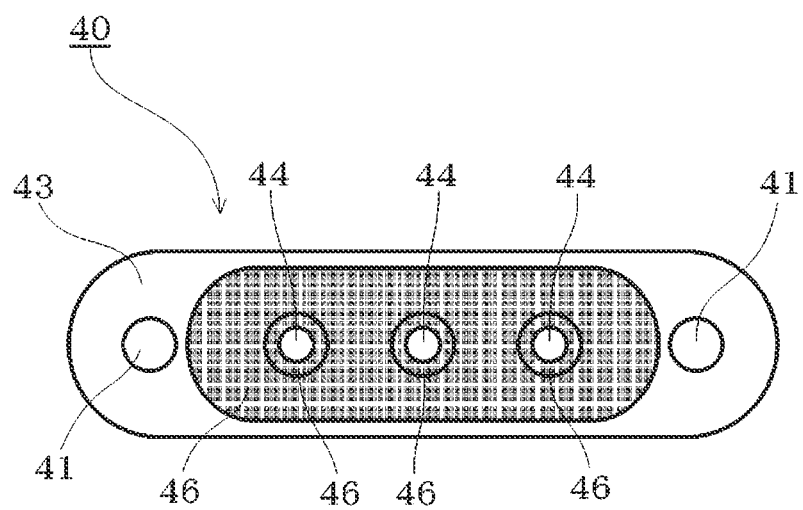
Figure 4B:
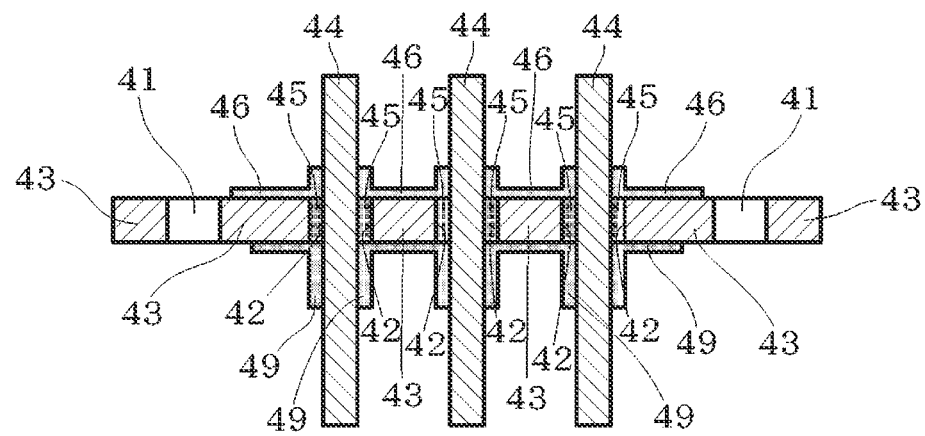
Figure 4C:
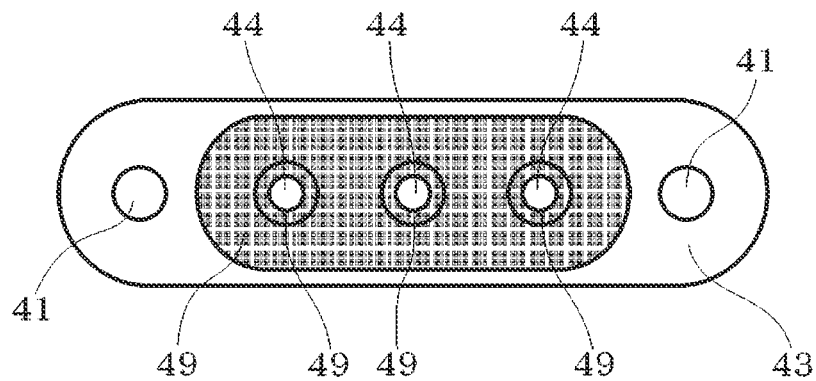

As illustrated in FIGS. 4A, 4B and 4C, an airtight terminal 40 of the present invention includes a metallic outer ring 43 having through holes 41 formed for screw fastening and sealing holes 42 arranged linearly, leads 44 inserted through the sealing holes 42 in the metallic outer ring 43, and pieces of an insulating material 45 to seal gaps between the metallic outer ring 43 and the respective leads 44, wherein the metallic outer ring 43 has a seal coat 46 possessing elastic deformability, the seal coat 46 being put on a surface of the metallic outer ring 43 that is at least a contact surface to which an external device is attached, the seal coat 46 is put in a shape of an oval flat sheet, the seal coat 46 also extends in an axial direction of the leads 44 to cover a desired length of each of the leads 44, and openings of the sealing holes 42 and surfaces of the pieces of the insulating material 45 are covered with the seal coat 46. The airtight terminal 40 is fastened to the external device with screws, with the seal coat 46 being pressed against an outer wall surface of the external device to which the airtight terminal 40 is attached and being elastically deformed. This hermetically seals a gap between the metallic outer ring 43 of the airtight terminal 40 and the wall surface of the external device being in contact with the airtight terminal 40 and thus ensures airtightness around an area where the metallic outer ring 43 is put on a terminal attachment hole in the external device. Attachment of the airtight terminal 40 can be completed readily and promptly only by putting the airtight terminal 40 on the terminal attachment hole in the external device and fastening the airtight terminal 40 to the external device with screws after the leads 44 are electrically connected to the external device.

As illustrated in FIGS. 4A, 4B and 4C, the airtight terminal 40 may further include an insulating coat 49 put on a lower surface of the metallic outer ring 43. The insulating coat 49 is similar in shape to the seal coat 46 applied to an upper surface of the metallic outer ring 43. A material that the insulating coat 49 is made of is not particularly limited and may be any insulating material. Examples of the insulating material preferably include plastics, ceramics, and glass materials. The insulating coat 49 may be made of a same material as the seal coat 46 or may be made of different material from the seal coat 46.

Figure 5A:
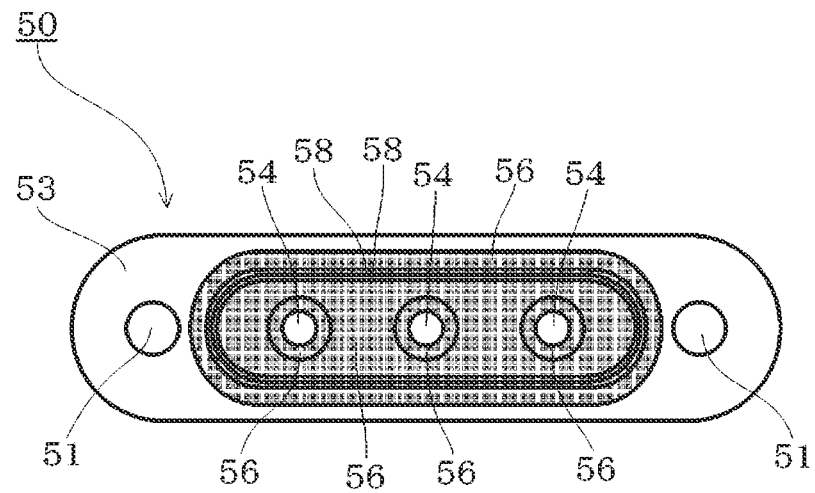
Figure 5B:
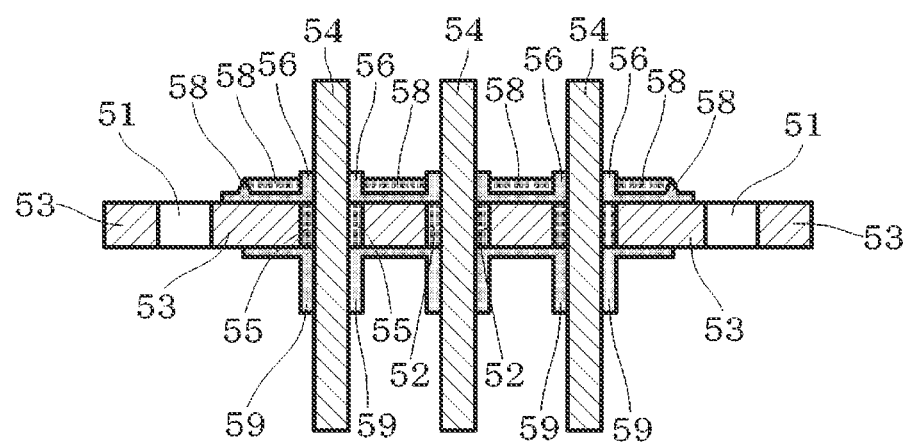
Figure 5C:
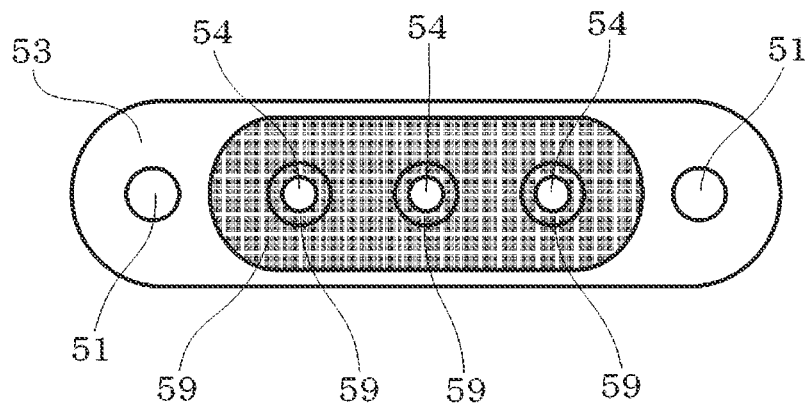

As illustrated in FIGS. 5A, 5B and 5C, an airtight terminal 50 of the present invention includes a metallic outer ring 53 having through holes 51 formed for screw fastening and sealing holes 52 arranged linearly, leads 54 inserted through the sealing holes 52 in the metallic outer ring 53, and pieces of an insulating material 55 to seal gaps between the metallic outer ring 53 and the respective leads 54, wherein the metallic outer ring 53 has a seal coat 56 possessing elastic deformability, the seal coat 56 being put on a surface of the metallic outer ring 53 that is at least a contact surface to which an external device is attached, the seal coat 56 is put in a shape of an oval flat sheet, the seal coat 56 extends along an axial direction of the leads 54 to cover a desired length of each of the leads 54, the flat sheet coat partly protrudes in a shape of an embankment to form a protrusion 58, the leads 54 are disposed inside a region surrounded with the embankment shape, and at least in a seal coat surface 56, openings of the sealing holes in the metallic outer ring 53 and surfaces of the pieces of the insulating material are covered with the seal coat 56. The airtight terminal 50 is fastened to the external device with screws, with the embankment-shaped seal coat 56 being pressed against an outer wall surface of the external device and being elastically deformed. The airtight terminal 50 is fastened to the external device with screws, with the flat sheet-shaped and the embankment-shaped seal material of the seal coat 56 being pressed against the outer wall surface of the external device and being elastically deformed. This hermetically seals a gap between the metallic outer ring 53 of the airtight terminal 50 and the wall surface of the external device being in contact with the airtight terminal 50 and thus ensures airtightness around an area where a terminal attachment hole in the external device is put on the metallic outer ring 53. Attachment of the airtight terminal 50 can be completed readily and promptly only by putting the airtight terminal 50 on the terminal attachment hole in the external device and fastening the airtight terminal 50 to the external device with screws after the leads 54 are electrically connected to the external device. In an example illustrated in FIGS. 5A, 5B and 5C, the protrusion 58 of the seal coat 56 protruding in the shape of an embankment in the axial direction of the leads is formed into a triangle in cross-sectional shape. The protrusion in cross-sectional shape may be modified into a polygon, or an end face of the protrusion in cross-sectional shape may be modified into a semicircle or a circular arc like an end face of a protrusion 68 of a seal coat 66 of an airtight terminal 60 of a modification example illustrated in FIGS. 6A, 6B and 6C. A protrusion similar to this protrusion may be further formed on the seal coat 26 of the airtight terminal 20 illustrated in FIGS. 2A, 2B and 2C.

As illustrated in FIGS. 5A, 5B, 5C and 6A, 6B, 6C, the airtight terminal 50 and the airtight terminal 60 of the modification example may each further include an insulating coat put on a lower surface of the metallic outer ring. The insulating coat is similar in shape to the seal coat applied to an upper surface of the metallic outer ring. A material that the insulating coat is made of is not particularly limited and may be any insulating material. Examples of the insulating material preferably include rubber, elastomers, plastics, clay, and glass materials. The insulating coat and the seal coat may be made of an identical material or may be made of different materials.

Although this specification illustrates airtight terminals each having three terminals, the scope of the present invention should not be limited to the illustrated airtight terminals but may include airtight terminals in any forms with the proviso that the airtight terminal has an outer ring and a lead that is sealed with a glass material in the outer ring.

EXAMPLES

As illustrated in FIGS. 1A, 1B and 1C, an airtight terminal 10 of Example 1 according to the present invention includes a metallic outer ring 13 made of carbon steel, a plurality of leads 14 made of an Fe—Cr iron-base alloy, and insulating materials 15 made of soda barium glass to seal gaps between the metallic outer ring 13 and the respective leads 14. The metallic outer ring 13 has a plurality of through holes 11 formed for screw fastening and a plurality of sealing holes 12 arranged linearly. The leads 14 are inserted through the sealing holes 12 in the metallic outer ring 13. The metallic outer ring 13 has a seal coat 16 made of silicone rubber on an upper surface of the metallic outer ring 13 that is a contact surface to which an external device is attached. The seal coat 16 is put in a shape of an oval embankment, and all the sealing holes 12 are disposed inside a region surrounded with the embankment shape. The airtight terminal 10 is fastened to the external device with screws, with the embankment-shaped seal coat 16 being pressed against an outer wall surface of the external device and being elastically deformed. At the same time, an attachment hole formed in the outer wall surface of the external device is disposed inside the oval embankment of the seal coat 16. This can hermetically isolate an inside and an outside of the oval embankment-shaped coat from each other. Attachment of the airtight terminal 10 can be completed readily and promptly only by putting the airtight terminal 10 on the attachment hole in the external device and fastening the airtight terminal 10 to the external device with screws after the leads 14 are electrically connected to the external device.

As illustrated in FIGS. 2A, 2B and 2C, an airtight terminal 20 of Example 2 according to the present invention includes a metallic outer ring 23 made of carbon steel, a plurality of leads 24 made of an Fe—Cr iron-base alloy, and insulating materials 25 made of soda barium glass to seal gaps between the metallic outer ring 23 and the respective leads 24. The metallic outer ring 23 has a plurality of through holes 21 formed for screw fastening, a plurality of sealing holes 22 arranged linearly, and a step 27 forming a contact surface for attachment of an external device. The leads 24 are inserted through the sealing holes 22 in the metallic outer ring 23. The metallic outer ring 23 has a seal coat 26 made of silicone rubber on an outer peripheral wall of the step 27, and all the sealing holes 22 are disposed inside a region surrounded with the step 27. The airtight terminal 20 is fastened to the external device with screws, with the seal coat 26 put on the step 27 being pressed against an inner wall surface of a terminal attachment hole in the external device and being elastically deformed. This hermetically seals a gap between the metallic outer ring 23 of the airtight terminal 20 and the terminal attachment hole in the external device and thus ensures airtightness around an area where the terminal attachment hole in the external device is put on the metallic outer ring 23. Attachment of the airtight terminal 20 can be completed readily and promptly only by putting the airtight terminal 20 on the terminal attachment hole in the external device and fastening the airtight terminal 20 to the external device with screws after the leads 24 are electrically connected to the external device.

As illustrated in FIGS. 3A, 3B and 3C, an airtight terminal 30 of Example 3 according to the present invention includes a metallic outer ring 33 made of carbon steel, a plurality of leads 34 made of an Fe—Cr iron-base alloy, and insulating materials 35 made of soda barium glass to seal gaps between the metallic outer ring 33 and the respective leads 34. The metallic outer ring 33 has a plurality of through holes 31 formed for screw fastening, a plurality of sealing holes 32 arranged linearly, and a peripheral wall part 37 that is an outer end extending vertically to form a contact surface to which an external device is attached. The leads 34 are inserted through the sealing holes 32 in the metallic outer ring 33. The metallic outer ring 33 has a seal coat 36 made of silicone rubber on the peripheral wall part 37 and an opening of each of the through holes 31 on the surface coming into contact with the external device, and all the sealing holes 32 are disposed inside a region surrounded with the seal coat 36 put on the peripheral wall part 37 and the openings of the through holes 31. The seal coat 36 is put in a shape of a flat sheet on the surface of the metallic outer ring 33. The flat sheet-shaped coating of the seal coat 36 partly protrudes in a shape of an embankment to form protrusions 38, and all the leads 34 are disposed inside the region surrounded with the seal coat 36 including the protrusions 38. The airtight terminal 30 is fastened to the external device with screws, with the seal coat 36 put on the peripheral wall part 37 and the openings of the through holes 31 being pressed against a wall surface of the external device that is in contact with the airtight terminal and being elastically deformed. This hermetically seals a gap between the metallic outer ring 33 of the airtight terminal 30 and the wall surface of the external device being in contact with the airtight terminal 30 and thus ensures airtightness around an area where a terminal attachment hole in the external device is put on the metallic outer ring 33. Attachment of the airtight terminal 30 can be completed readily and promptly only by putting the airtight terminal 30 on the terminal attachment hole in the external device and fastening the airtight terminal 30 to the external device with screws after the leads 34 are electrically connected to the external device.

As illustrated in FIGS. 4A, 4B and 4C, an airtight terminal 40 of Example 4 according to the present invention includes a metallic outer ring 43 made of stainless steel, a plurality of leads 44 made of an Fe—Cr iron-base alloy, and insulating materials 45 made of soda barium glass to seal gaps between the metallic outer ring 43 and the respective leads 44. The metallic outer ring 43 has a plurality of through holes 41 formed for screw fastening and a plurality of sealing holes 42 arranged linearly. The leads 44 are inserted through the sealing holes 42 in the metallic outer ring 43. The metallic outer ring 43 has a seal coat 46 made of silicone rubber on an upper surface of the metallic outer ring 43 that is a contact surface to which an external device is attached. The seal coat 46 is put in a shape of an oval flat sheet. The seal coat 46 also extends in an axial direction of the leads 44 to cover a desired length of each of the leads 44, and the sealing holes 42 and surfaces of the insulating materials 45 are covered with the seal coat 46. The airtight terminal 40 is fastened to the external device with screws, with the seal coat 46 being pressed against an outer wall surface of the external device and being elastically deformed. This hermetically seals a gap between the metallic outer ring 43 of the airtight terminal 40 and the wall surface of the external device being in contact with the airtight terminal 40 and thus ensures airtightness around an area where a terminal attachment hole in the external device is put on the metallic outer ring 43. Attachment of the airtight terminal 40 can be completed readily and promptly only by putting the airtight terminal 40 on the terminal attachment hole in the external device and fastening the airtight terminal 40 to the external device with screws after the leads 44 are electrically connected to the external device. The airtight terminal 40 of Example 4 illustrated in FIGS. 4A, 4B and 4C may further include an insulating coat 49 on a surface on which the seal coat 46 is not put. In other words, the insulating coat 49 that is made of silicone rubber and that is similar in shape to the seal coat 46 applied to an upper surface of the metallic outer ring 43 is further put on a lower surface of the metallic outer ring 43.

As illustrated in FIGS. 5A, 5B and 5C, an airtight terminal 50 of Example 5 according to the present invention includes a metallic outer ring 53 having a plurality of through holes 51 formed for screw fastening and a plurality of sealing holes 52 arranged linearly, a plurality of leads 54 inserted through the sealing holes 52 in the metallic outer ring 53, and pieces of an insulating material 55 to seal gaps between the metallic outer ring 53 and the respective leads 54. The metallic outer ring 53 has a seal coat 56 made of silicone rubber on an upper surface of the metallic outer ring 53 that is a contact surface to which an external device is attached. The seal coat 56 is put in a shape of an oval flat sheet. The seal coat 56 also extends in an axial direction of the leads 54 to cover a desired length of each of the leads 54. The flat sheet-shaped coating of the seal coat 56 partly protrudes in a shape of an embankment to form a protrusion 58. All the leads 54 are disposed inside a region surrounded with the protrusion 58. In the contact surface to which the external device is attached, the sealing holes 52 in the metallic outer ring 53 and surfaces of the pieces of the insulating material 55 are covered with the seal coat 56. The airtight terminal 50 is fastened to the external device with screws, with an embankment-shaped seal material being pressed against an outer wall surface of the external device and being elastically deformed. The airtight terminal 50 is fastened to the external device with screws, with the flat sheet-shaped and the embankment-shaped seal coat 56 being pressed against the outer wall surface of the external device and being elastically deformed. This hermetically seals a gap between the wall surface of the external device being in contact with the airtight terminal 50 and the metallic outer ring 53 of the airtight terminal 50 and thus ensures airtightness around an area where a terminal attachment hole in the external device is put on the metallic outer ring 53. Attachment of the airtight terminal 50 can be completed readily and promptly only by putting the airtight terminal 50 on the terminal attachment hole in the external device and fastening the airtight terminal 50 to the external device with screws after the leads 54 are electrically connected to the external device. In an example illustrated in FIGS. 5A, 5B and 5C, an end face of the protrusion of the seal material protruding in the shape of an embankment in the axial direction of the leads is formed into a triangle in cross-sectional shape. The end face of the protrusion in cross-sectional shape may be modified into a polygon, or a semicircle or a circular arc like an end face of a protrusion of an airtight terminal 60 of a modification example illustrated in FIGS. 6A, 6B and 6C.

Figure 6A:
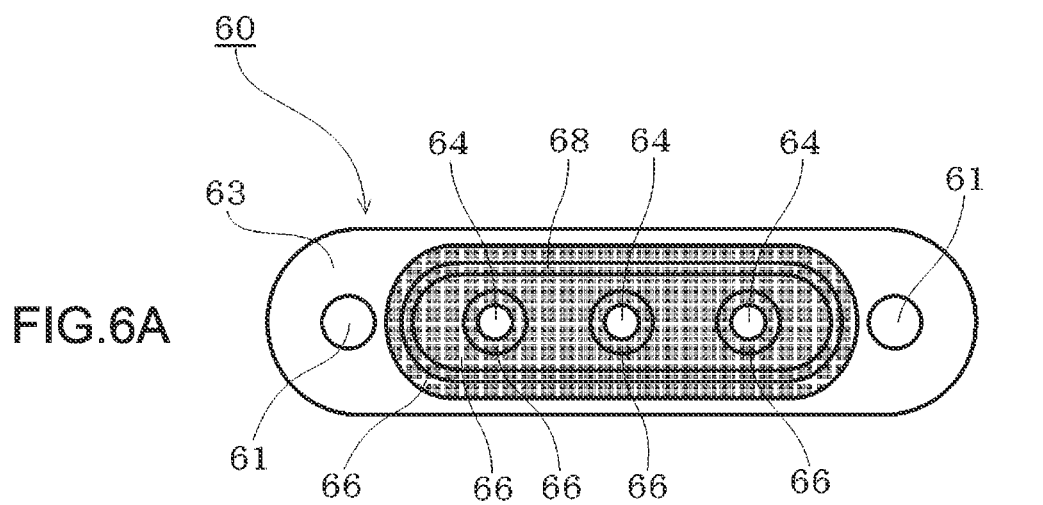
Figure 6B:
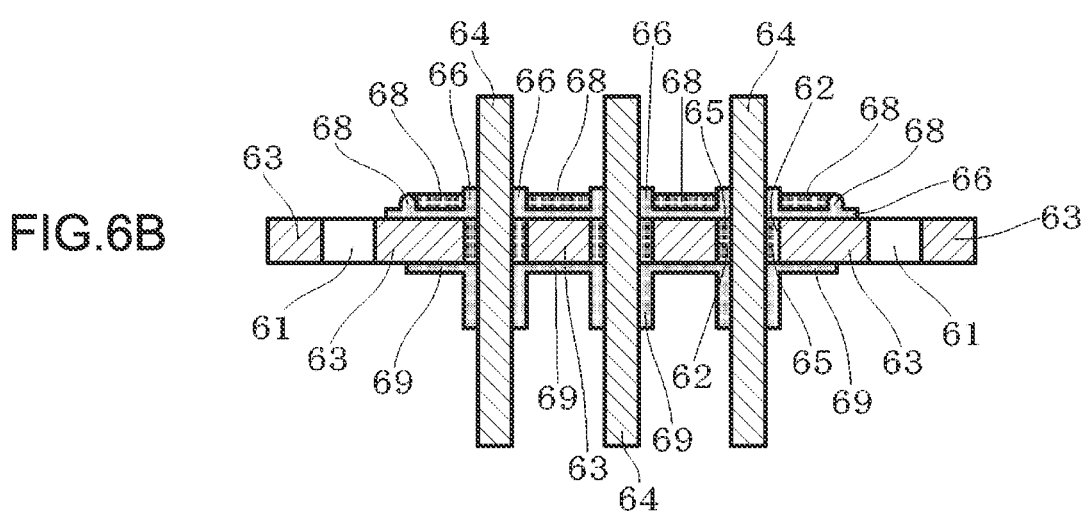
Figure 6C:
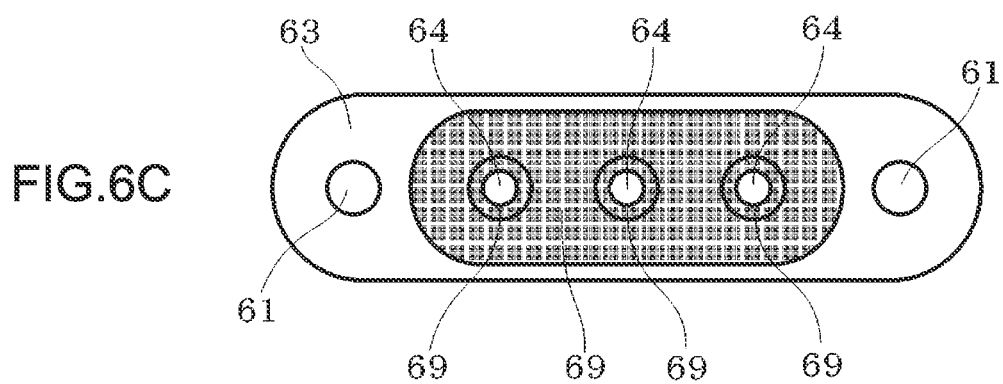

The airtight terminal 50 of Example 5 illustrated in FIGS. 5A, 5B and 5C and the airtight terminal 60 of the modification example illustrated in FIGS. 6A, 6B and 6C may each further include an insulating coat put on a surface on which the seal coat is not put. In other words, an insulating coat 59 or 69 that is made of silicone rubber and that is similar in shape to the seal coat applied to the upper surface of the metallic outer ring is further put on a lower surface of the metallic outer ring.

The metal surface of the airtight terminal according to the present invention may be additionally plated with a desired coat after the leads are sealed with glass in the metallic outer ring. The leads and the metallic outer ring described above in the Examples may be made of any metallic material. For instance, the material is not limited to the Fe—Cr alloy and may be changed appropriately to another material such as an Fe—Ni alloy, carbon steel, a copper alloy, or an aluminum alloy. Likewise, the insulating material described in the Examples may be made of any grass material other than soda barium glass, with the proviso that the material is capable of electrically insulating and hermetically sealing the leads and the metallic outer ring. The insulating material according to the present invention may be partly made of glass materials that differ from each other as needed. The glass material may also be replaced, in part or in whole, with a resin material such as an epoxy resin as needed.

INDUSTRIAL APPLICABILITY

The present invention can be applied to airtight terminals and particularly to an airtight terminal for automotive application.

LIST OF REFERENCE SIGNS

10, 20, 30, 40, 50, 60 airtight terminal,
11, 21, 31, 41, 51, 61 through hole,
12, 22, 32, 42, 52, 62 sealing hole,
13, 23, 33, 43, 53, 63 metallic outer ring,
14, 24, 34, 44, 54, 64 lead,
15, 25, 35, 45, 55, 65 insulating material,
16, 26, 36, 46, 56, 66 seal coat,
27 step,
37 peripheral wall part,
38, 58, 68 protrusion,
49, 59, 69 insulating coat

The invention claimed is:
1. An airtight terminal comprising:
a metallic outer ring having a plurality of sealing holes and a through hole for screw fastening, wherein the plurality of sealing holes and the through hole are arranged linearly;
a lead inserted through a respective sealing hole of the plurality of sealing holes in the metallic outer ring; and
an insulating material to hermetically seal a gap between the metallic outer ring and the lead, wherein the metallic outer ring has a seal coat put on a surface of the metallic outer ring coming into contact with an external device,
wherein the plurality of sealing holes is positioned inside a region of the metallic outer ring having the seal coat on the surface and the through hole is positioned outside the region.
2. The airtight terminal according to claim 1, wherein the seal coat is made of a structure possessing elastic deformability.
3. The airtight terminal according to claim 1, wherein the seal coat is made of a material selected from rubber, an elastomer, a plastic, and a metal, or either of a composite material and a composite structure that is made up of any of rubber, an elastomer, a plastic, and a metal.

4. The airtight terminal according to claim 1, wherein the metallic outer ring further has a step forming a surface coming into contact with an external device.

5. The airtight terminal according to claim 1, wherein the metallic outer ring further has a peripheral wall part that is an outer end of the metallic outer ring extending vertically to form a surface coming into contact with an external device.

6. The airtight terminal according to claim 1, wherein the seal coat is put in a shape of an oval embankment.

7. The airtight terminal according to claim 1, wherein the seal coat is put in a shape of a flat sheet on a predetermined surface.

8. The airtight terminal according to claim 7, wherein the flat sheet-shaped coating of the seal coat partly protrudes in a shape of an embankment to further form a protrusion.

9. The airtight terminal according to claim 8, wherein an end face of the protrusion is formed into a triangle, a polygon, a semicircle, or a circular arc in cross-sectional shape.

10. The airtight terminal according to claim 1, wherein the lead is disposed inside a region surrounded with the seal coat on the surface coming into contact with an external device.

11. The airtight terminal according to claim 1, wherein the plurality of sealing holes and a surface of the insulating material for the lead are covered with the seal coat on the surface coming into contact with an external device.

12. The airtight terminal according to claim 1, wherein the metallic outer ring further has an insulating coat on a surface of the metallic outer ring on which the seal coat is not put.

13. The airtight terminal according to claim 12, wherein the insulating coat is made of a same material as the seal coat.

14. The airtight terminal according to claim 12, wherein the insulating coat is made of different material from the seal coat.

15. The airtight terminal according to claim 12, wherein the insulating coat is made of any one of rubber, an elastomer, a plastic, clay, and glass.

16. The airtight terminal according to claim 1, wherein the through hole is not covered by the insulating material.

17. An airtight terminal comprising:
a metallic outer ring having a sealing hole;
a lead inserted through the sealing hole in the metallic outer ring; and
an insulating material to hermetically seal a gap between the metallic outer ring and the lead,
wherein the metallic outer ring has a seal coat put on a surface of the metallic outer ring coming into contact with an external device,
wherein the seal coat is fixed on the metallic outer ring and elastically deformed in an axial direction of the lead when coming into contact with the external device.

18. An airtight terminal comprising:
a metallic outer ring having a sealing hole and a step forming a contact surface to which an external device is attached;
a lead inserted through the sealing hole in the metallic outer ring; and
an insulating material to hermetically seal a gap between the metallic outer ring and the lead,
wherein the metallic outer ring has a seal coat on an outer peripheral wall of the step,
wherein all the sealing holes are disposed inside a region surrounded with the step.

19. An airtight terminal comprising:
a metallic outer ring having a sealing hole and a peripheral wall part extending vertically to form a contact surface to which an external device is attached;
a lead inserted through the sealing hole in the metallic outer ring; and
an insulating material to hermetically seal a gap between the metallic outer ring and the lead,
wherein the metallic outer ring has a seal coat fixed on a surface of the peripheral wall part,
wherein all the sealing holes are disposed inside a region surrounded with the peripheral wall part.

20. An airtight terminal comprising:
a metallic outer ring having a sealing hole;
a lead inserted through the sealing hole in the metallic outer ring; and
an insulating material to hermetically seal a gap between the metallic outer ring and the lead,
wherein the metallic outer ring has a seal coat fixed on an upper surface of the metallic outer ring, the upper surface being a contact surface to which an external device is attached, seal coat extending in an axial direction of the lead to cover a desired length of the lead,
wherein the sealing hole and a predetermined surface of the insulating material are covered with the seal coat.

* * * * *